US012774021B2

(12) United States Patent
Jones et al.

(10) Patent No.: US 12,774,021 B2
(45) Date of Patent: Oct. 27, 2026

(54) COLLAPSIBLE WHEELBARROW

(71) Applicants: Ryan S. Jones, Effingham, IL (US); Larisa M. Jones, Effingham, IL (US)

(72) Inventors: Ryan S. Jones, Effingham, IL (US); Larisa M. Jones, Effingham, IL (US)

( * ) Notice: Subject to any disclaimer, the term of this patent is extended or adjusted under 35 U.S.C. 154(b) by 198 days.

(21) Appl. No.: 18/748,728

(22) Filed: Jun. 20, 2024

(65) Prior Publication Data

US 2026/0257711 A1 Sep. 3, 2026

(51) Int. Cl.
*B62B 1/20* (2006.01)

(52) U.S. Cl.
CPC .......... *B62B 1/208* (2013.01); *B62B 2205/10* (2013.01)

(58) Field of Classification Search
CPC .. B62B 1/208; B62B 1/00; B62B 1/18; B62B 1/20; B62B 2205/10; B62B 2205/00
See application file for complete search history.

(56) References Cited

U.S. PATENT DOCUMENTS 1,134,258 A 4/1915 Curtis
1,242,418 A * 10/1917 Booth .................... B62B 1/208 280/653
2,727,751 A * 12/1955 Souris .................... B62B 1/208 280/653
2,767,996 A 10/1956 Seyforth
2,800,335 A * 7/1957 Clapp .................... B62B 1/208 280/42
3,166,339 A 1/1965 Earley
3,552,760 A 1/1971 Richard
3,690,692 A 9/1972 Julian et al.
3,722,904 A * 3/1973 Puckett .................. B62B 1/208 280/653
D245,971 S 10/1977 Martens
4,261,596 A 4/1981 Douglas
4,401,313 A * 8/1983 Filas ...................... B62B 1/208 D34/16

(Continued)

FOREIGN PATENT DOCUMENTS

GB 189820492 A 1/1899
GB 2051692 A 1/1981

(Continued)

OTHER PUBLICATIONS

TranslationWO2019169414 A1.

*Primary Examiner* — James M Dolak
(74) *Attorney, Agent, or Firm* — Grace J. Fishel

(57) ABSTRACT

A collapsible wheelbarrow with a barrow mounted on a commercially available chassis having a pair of handles merging towards a front end and an axle with a pair of wheels. The barrow includes a bottom panel that is configured to mount on the chassis. Back and side panels are connected to the bottom panel with hinges. Other hinges with removable hinge pins connect the front panel to the bottom panel and front and back panels to the side panels. Side flanges on the front and back panel provide a leakage seal. With the removable hinge pins pulled, a stacked unit is formed with the back panel folded flat on the handles, the side panels folded together and sandwiched between the bottom panel and the front panel. Posts are provided on the underside of the bottom panel upon which the wheels may be hung when the stacked unit is positioned vertically.

10 Claims, 5 Drawing Sheets

(56) References Cited

U.S. PATENT DOCUMENTS

| | | | | | |
|---|---|---|---|---|---|
| 5,908,202 | A * | 6/1999 | Leger | B62B 1/208 | 280/653 |
| 6,017,053 | A * | 1/2000 | Leger | B62B 1/208 | 280/653 |
| D687,614 | S | 8/2013 | Simpson et al. | | |
| 8,596,671 | B2 * | 12/2013 | Myrant | B62B 1/208 | 280/655 |
| 9,174,658 | B2 * | 11/2015 | Higgins | B62B 1/208 | |
| 11,142,231 | B2 * | 10/2021 | Draleau | B62B 1/12 | |
| 2011/0291371 | A1 | 12/2011 | Harris | | |

FOREIGN PATENT DOCUMENTS

| | | | |
|---|---|---|---|
| GB | 2051692 | B | 6/1983 |
| WO | 2019169414 | A1 | 9/2019 |

* cited by examiner

COLLAPSIBLE WHEELBARROW

BACKGROUND OF THE INVENTION

Field of the Invention

The present invention relates to a wheelbarrow that can be collapsed flat for travel and storage built on a commonly available chassis with a collapsible barrow.

Brief Description of the Prior Art

A conventional wheelbarrow is big and has an odd shape such that it does not close pack with other equipment. Because of the storage problem, wheelbarrows are frequently left outside such that rusting is a problem and if left right side up, water in the barrow is a mosquito breeding site. Another problem with wheelbarrows is that they are difficult to port to a job site for the same reason. The prior art is replete with proposed solutions to the above problem of storage and travel but the prior art collapsible wheelbarrows are expensive to make.

BRIEF SUMMARY OF VARIOUS PREFERRED EMBODIMENTS OF THE INVENTION

In view of the above, it is an object of the present invention to provide a collapsible wheelbarrow built on a commonly available and therefore competitively priced chassis. It is another object to provide a barrow formed of metal or plastic panels assembled with hinges that when mounted on a conventional chassis provides a wheelbarrow which functions like a conventional wheelbarrow. Other objects and features of the invention will be in part apparent and in part pointed out hereinafter.

In accordance with the invention, a collapsible barrow is provided that is configured for attachment to a chassis with a pair of handles converging towards a front end with an axle suspended from the handles for wheels.

The barrow includes a bottom panel with a rim, a front panel, a back panel and side panels that in assembled form and mounted on the chassis functions like a conventional wheelbarrow. In an embodiment, a bottom edge of the back panel and side panels is attached to the rim of bottom panel with a continuous hinge such that the back panel is configured to pivot backward against the handles and the side panels are configured to fold together over the bottom panel.

In one embodiment, each side edge of the side panels is attached to a corresponding side edge of the front and back panel with a sidewall knuckle hinge secured with a sidewall elongated hinge pin such that front, back and side panels are configured to be joined together. With a further embodiment, a bottom edge of the front panel is attached to the rim of the bottom panel with a bottom knuckle hinge secured with a bottom elongated hinge pin such that the front panel is configured for removal and for stacking on the side panels when the side panels are folded together.

The bottom panel, front panel, back panel, side panels and hinges may be formed of metal but in other cases they may be formed of plastic or a combination of plastic and metal materials.

In some cases, at least one support leg is hinged to the bottom panel and at least one post is attached to the underside of the bottom panel. The post is configured for attaching one of the wheels on the bottom panel with an attachment pin previously used to attached the wheel to the axle.

In other implementations each side edge of the back panel and the front panel has a flange that overlaps the side panels to provide a seal against leakage of material. In still further cases thereof, each sidewall knuckle hinge includes a first set of knuckles attached in a channel formed between the flange and the back panel or front panel and a second set of knuckles attached to a corresponding edge of the side panels, each of said first and second set of knuckles intermeshed and joined by the sidewall elongated hinge pin.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
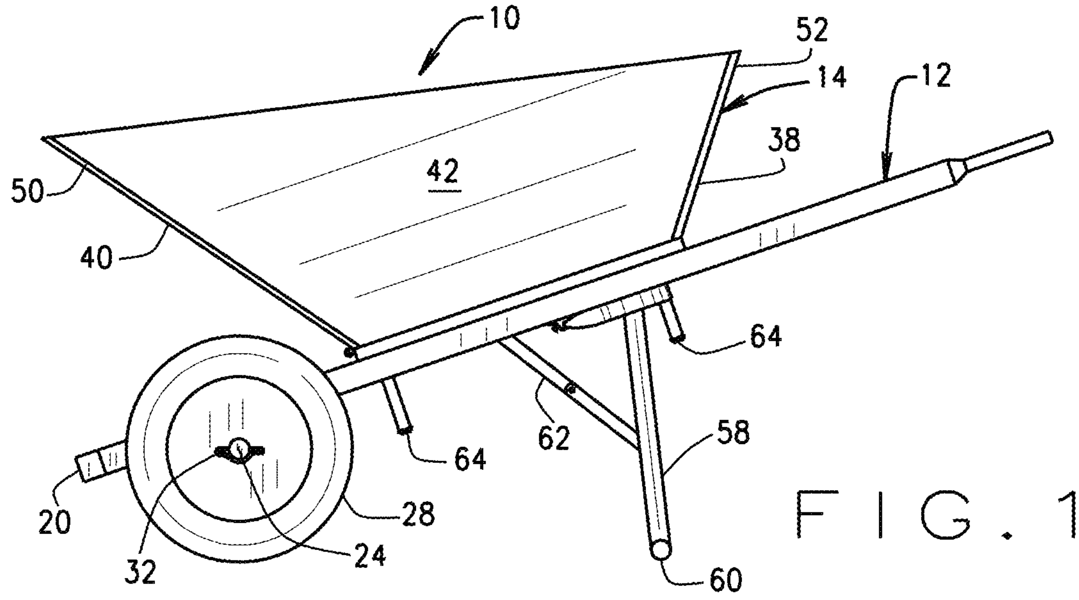
FIG. 1 is a side view of a collapsible wheelbarrow including a barrow mounted on a chassis in accordance with the present invention.
Figure 2:
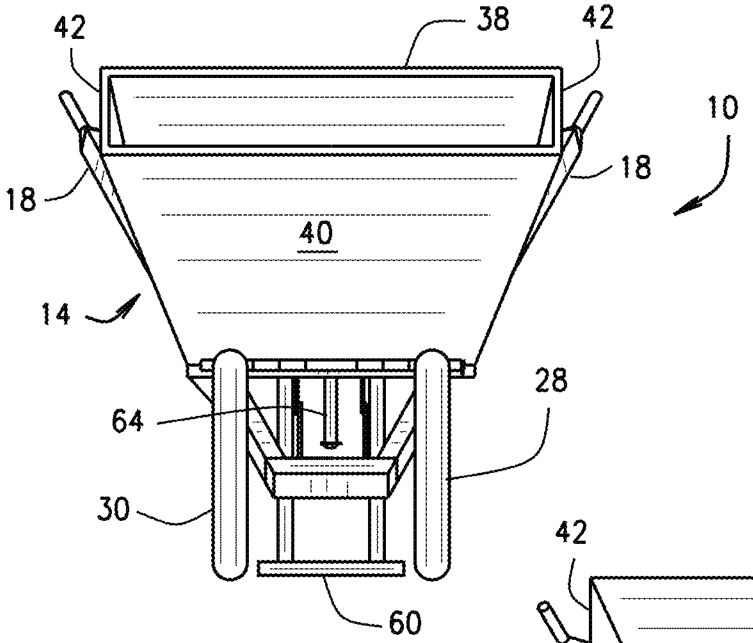
FIG. 2 if a front view thereof.
Figure 3:
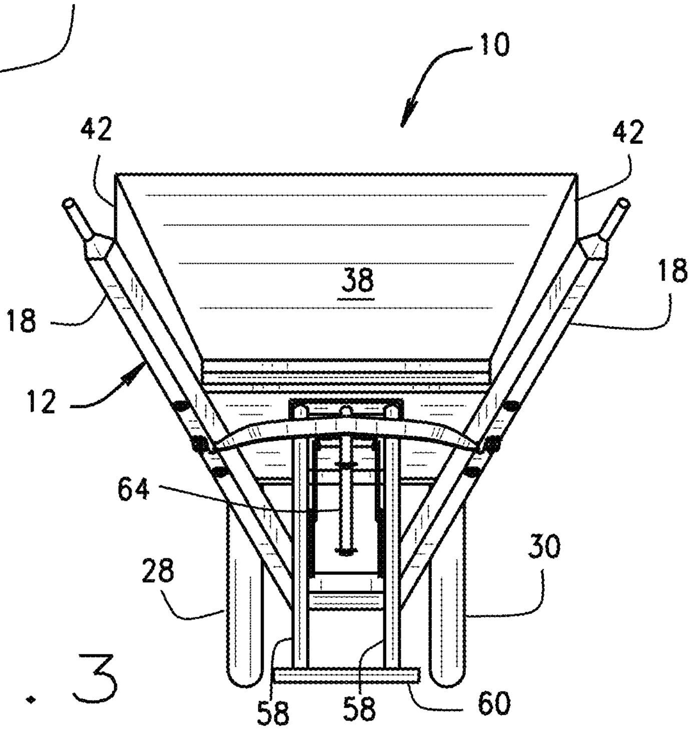
FIG. 3 is a rear view thereof.
Figure 4:
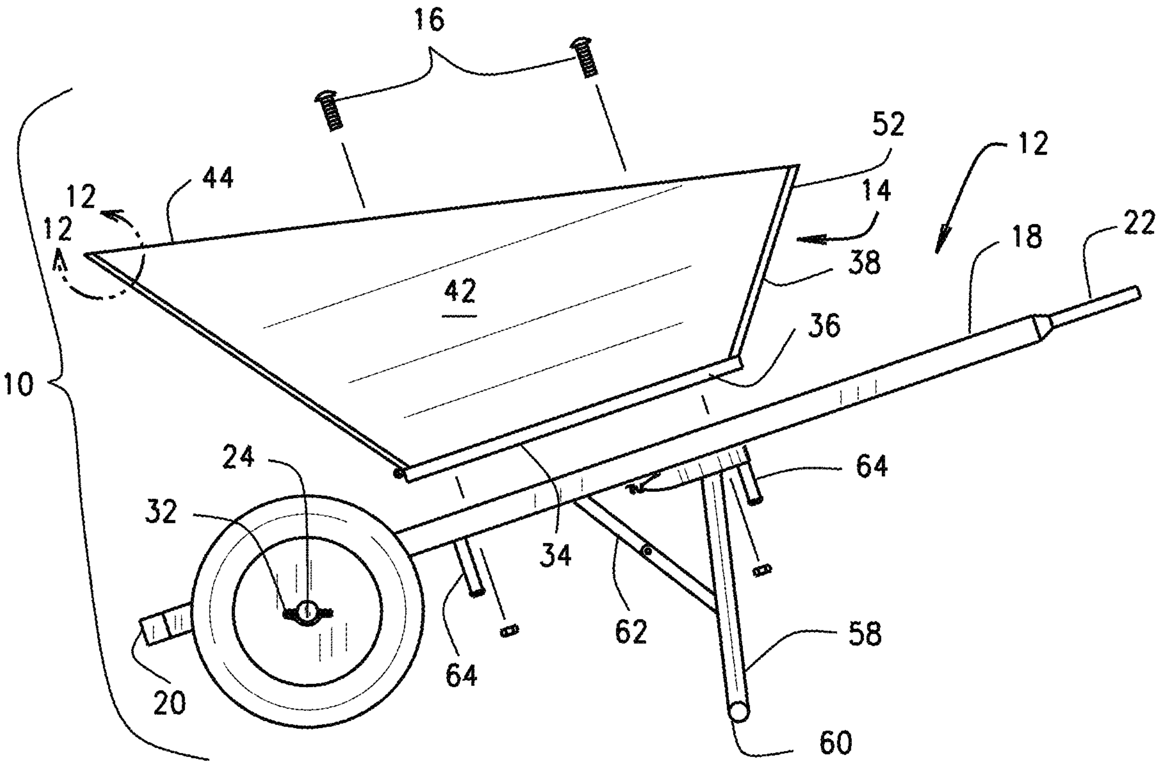
FIG. 4 is an exploded view of the barrow detached from the chassis.

Referring to the drawings more particularly by reference character, a collapsible wheelbarrow 10 includes a chassis 12 and a barrow 14 which as shown in FIG. 4 may be bolted 16 or otherwise attached to the chassis. Chassis 12 includes a pair of handles 18 converging towards a front end. Handles may be formed of wood or box metal and joined at the front by a cross member 20. The rear ends of handles 18 may be provided with hand grips 22.

Figure 10:
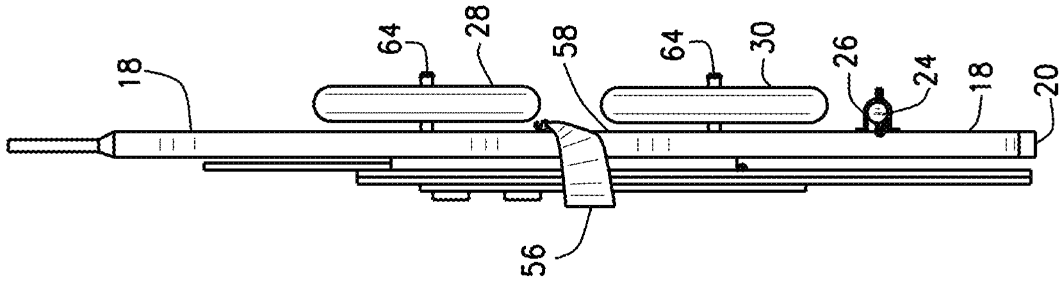
FIG. 10 is a side elevation of the stacked assembly with the wheels hung on the backside of the bottom panel.

An axle 24 is suspended from handles 18 inboard the front end of chassis 12 on brackets 26 (FIG. 10). A first and second wheel 28, 30 is mounted at opposite ends of axle 24 on a bearing permitting the wheel to spin smoothly on the axis. Each of wheels 28, 30 is secured to axle 24 with a pin connector 32 such as a cotter pin.

Figure 5:
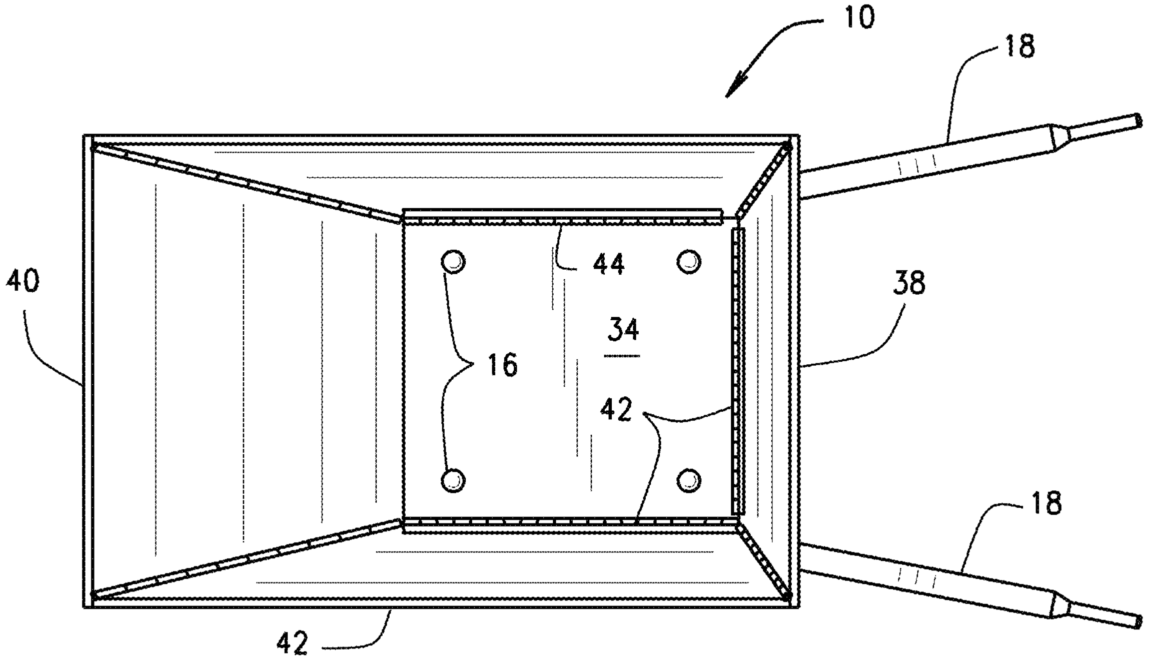
FIG. 5 is a top view thereof.

As mentioned above, barrow 14 is mounted on chassis 12 and includes in major part a bottom panel 34 with a rim 36, a back panel 38, a front panel 40 and side panels 42, respectively. As shown in the drawings, bottom panel 34 is rectangular and substantially flat. Back and front panels 38, 40 are trapezoidal and side panels 42 are quadrilateral with a longer front side edge such that the forward end of barrow 14 overhangs wheels 28,30. Panels 38, 40 and 42 may be formed of sheet metal and flare outwardly as best seen in FIG. 5 when assembled to maximize the volume of material that wheelbarrow 10 may carry. A top edge of back panel 38, front panel 40 and side panels 42, is rolled or folded over for strength and to eliminate sharp edges.

Figure 8:
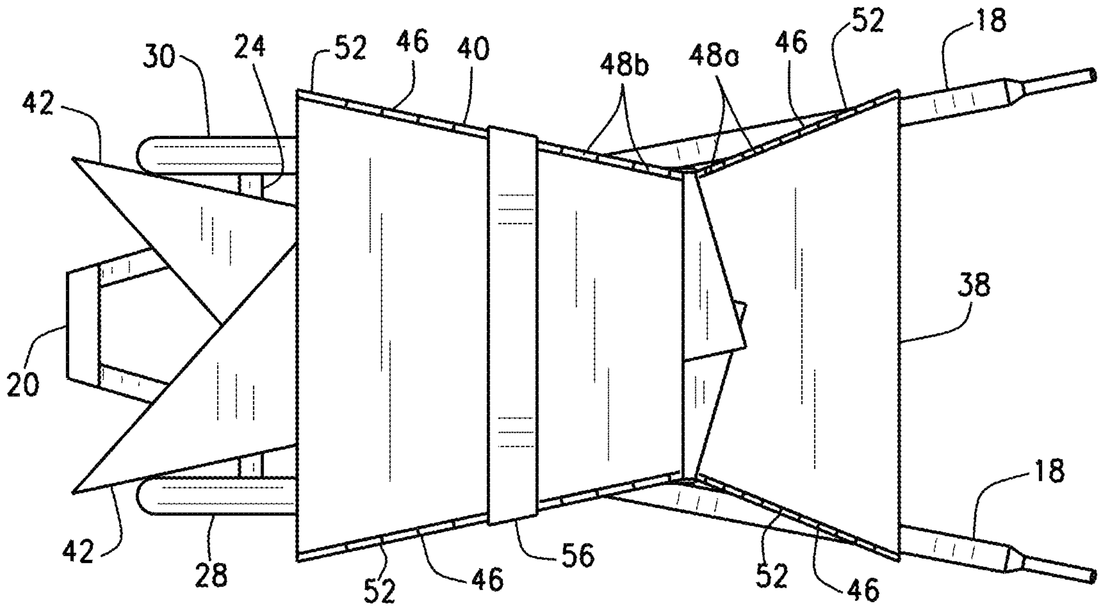
FIG. 8 is a top view of the side panels folded together and sandwiched between the bottom panel and the front panel forming a stacked assembly.
Figure 11:
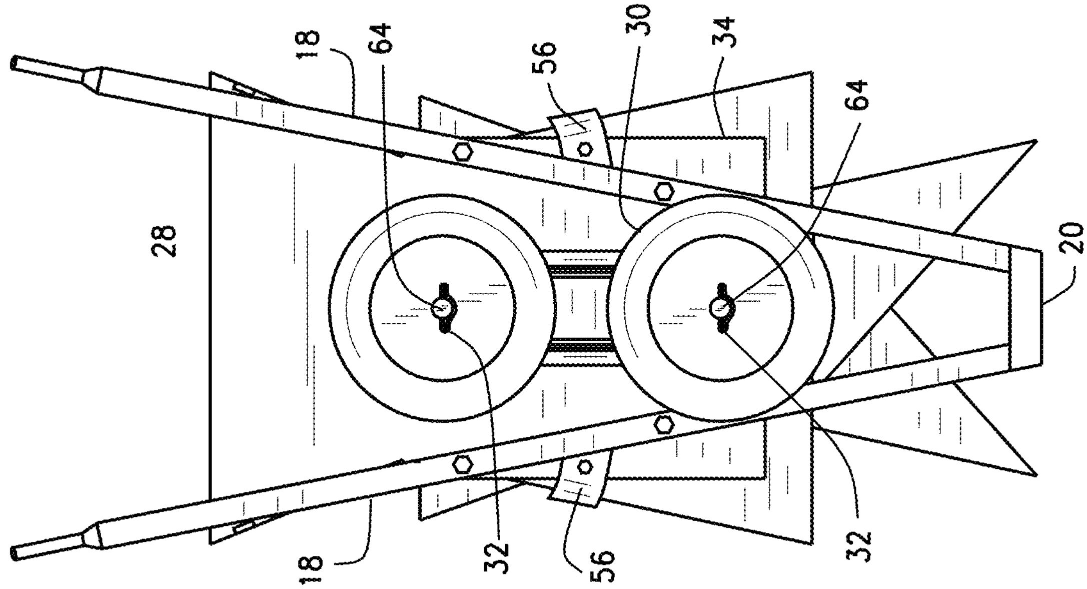
FIG. 11 is back elevation of the stacked assembly with the wheels hung on the back side of the bottom panel; and, FIG. 12 is a detail taken along the line of 12-12 in FIG. 4.

Referring now to FIGS. 5-12 the front, back, and side panels 38, 40 and 42 are rotatably mounted on bottom panel 34 and as discussed below are joined together to form barrow 14. Beginning with FIG. 5, a bottom edge of back panel 38 and side panels 42 is attached to rim 36 of bottom panel 34 with a continuous hinge 44 such as a piano hinge that runs the length of each seam. Continuous hinge 44 allows back panel 38 to pivot backward against handles 18 as shown in FIGS. 8 and 11. Continuous hinge 44 allows side panels 42 to fold together over bottom panel 34 as also seen in FIG. 8. When continuous hinge 44 is a piano hinge, a first leaf of each hinge is welded to an inside of rim 36 while a second leaf is welded to a corresponding edge of the panel to be connected. While barrow 14 as shown in the drawings is formed it metal, it will be understood that it may also be formed of plastic. In that case, continuous hinge 44 may be a live hinge wherein the plastic material is thinned such that adjoining panels may be pivoted along the fold line.

Figure 6:
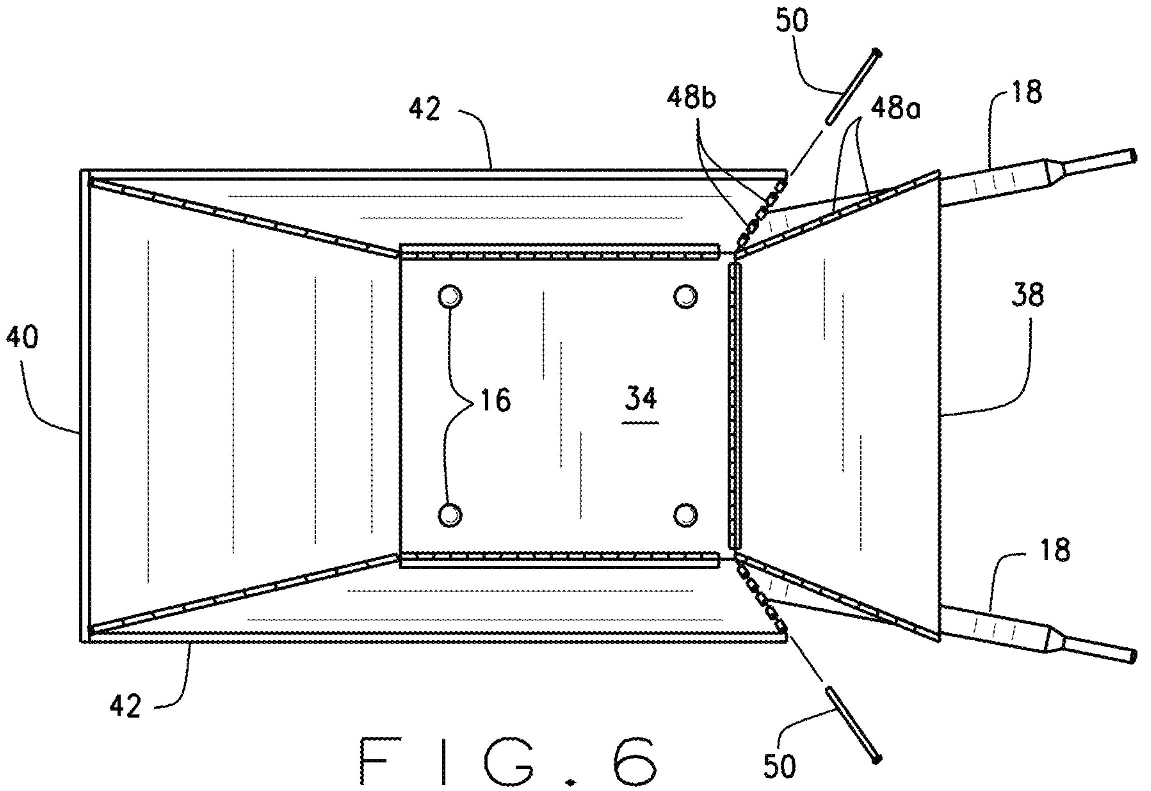
FIG. 6 is a top view with a back panel detached from the side panels.

Each side edge 46 of back panel 38, front panel 40 and side panels 42 is attached to a corresponding side edge of front and back panels with a knuckle hinge 48 secured with elongated hinge pin 50 such that front panel 40, back panel 38 and side panels 42 are joined together. As seen in FIG. 6, knuckles 42*a*, 42*b* are arranged in a predetermined intermeshing sequence on hinge pin 50 resulting in a pivot mounting of the panels.

Front panel 40 and back panel 38 have a flange 52 along side edges that overlaps the side edges of side panels 42. As shown the FIG. 12 detail, a first set of knuckles 48*a* is welded in a channel 54 formed between the inside of front 40 and back panel 38 and flange 42. A second set of knuckles 48*b* is welded on the corresponding inside of side panels 42. The overlap of flange 52 on side panels 42 provides a seal against leakage of material therethrough and rigidifies the seam. A bottom edge of front panel 40 is attached to rim 36 of bottom panel 34 with a knuckle hinge 48 wherein first and second sets of knuckles 48*a*, 48*b* are welded to the outside of rim 38 and front panel and joined with an elongated hinge pin 50.

Figure 7:
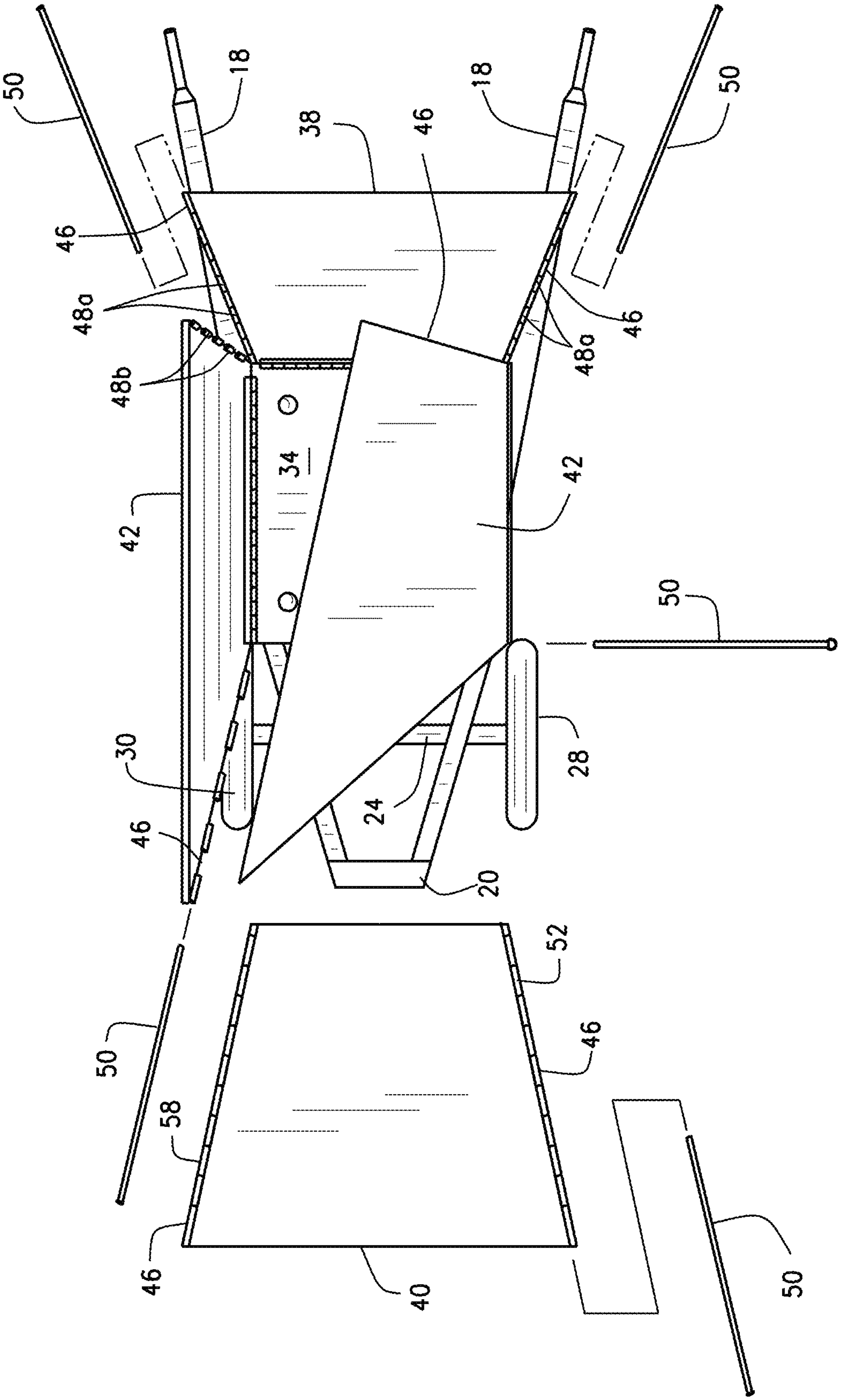
FIG. 7 is a top view with the front panel detached from the side panels and from the bottom panel.
Figure 12:
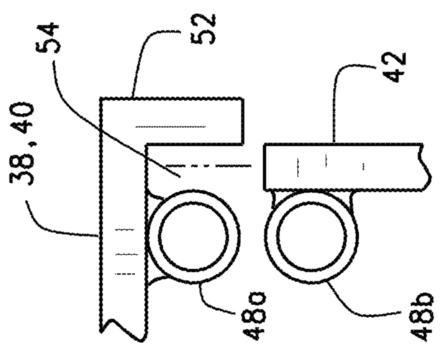
Figure 9:
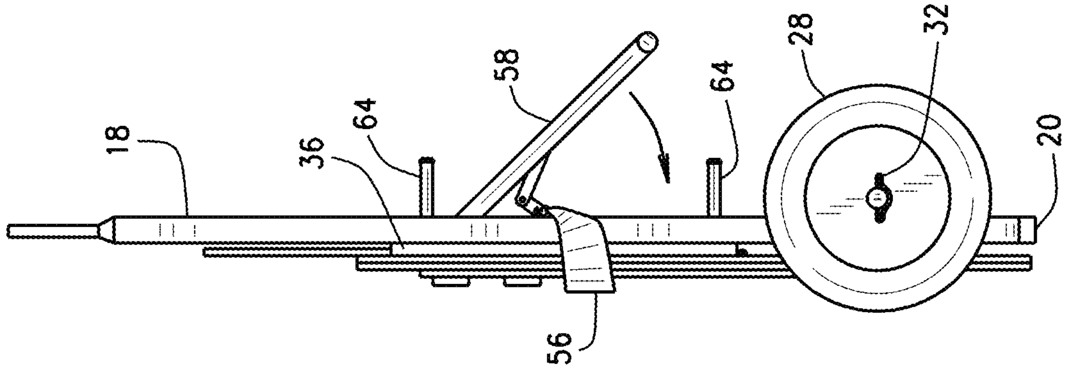
FIG. 9 is a side elevation of the stacked assembly stood vertically on a cross member joining the handles.

With pins 50 pulled as shown in FIG. 7, front panel is detachable from bottom panel 34 with back panel 38 laid flat on handles 18. With side panels 42 folded together, the side panels are sandwiched between bottom panel 34 and front panel 40 for shipment and storage. As shown in FIG. 8, a bungee cord 56 or the like secures the stack such that wheelbarrow 10 can be set upright on cross member 20 as shown in FIG. 9.

At least one support leg 58 is hinged to bottom panel 34 such that it is rotatable between parallel and perpendicular. As shown in the drawings, a pair of legs 58 is hinged at the top to a common axle suspended on brackets inboard an end of bottom panel 34. Legs 58 are connect at the foot with a cross brace 60 for stability and support. A pair of braces 62 are attached to an underside of bottom panel 34 and positioned between legs 58. Braces 62 are hinged and automatically unfold and latch when legs 58 are rotated vertically to bottom panel 34.

At least one post 64 having a diameter like axle 24 is welded or otherwise attached on the underside of bottom panel 34. When barrow 14 is stacked as shown in FIG. 9, each of wheels 28, 30 may be detached from axle 24 and hung vertically on one of posts 64. The attachment pin 32 used to attach the wheel to axle 24 may be used to secure the wheel to post 64.

In use wheelbarrow 10 when assembled as shown in FIG. 1-5 functions like a conventional wheelbarrow including outwardly sloping upstanding walls 38, 40 and 42 and a flat bottom 34. The advantage of the instant invention is that it collapses into a substantially flat unit that facilitates both travel and storage.

When an operator is ready to collapse wheelbarrow, pins 50 securing back panel 38 to side panels 42 may be pulled allowing back panel 38 to fold down against handles 18 as shown in FIG. 6. Next, pins 50 attaching front panel 40 to side panels 42 are pulled which allows the side panels to fold together as shown in FIG. 7.

With continuing reference to FIG. 7 and working from the front, the operator may then pull pin 50 attaching front panel 40 to bottom panel 34 and stack the front panel on the folded side panels 42. With side panels 42 sandwiched between bottom panel 34 and front panel 40, a bungee cord 56 attached to the underside of bottom panel may be used to secure the stack as seen in FIG. 8.

Turning to FIG. 9 and with the stack of panels secured, wheelbarrow 10 may be positioned upright on cross member 20 of handles 18. Cross brace 60 may then be released, allowing support leg 58 to pivot parallel to bottom panel 34. The operator may then remove first and second wheels 28, 30 from axle 24 and attach them to posts 64 with the pin connectors 32 formerly used to attach them to the axle. The unit is then ready for transport or storage.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible wheelbarrow comprising:

a chassis with a pair of handles converging towards a front end, an axle suspended from the pair of handles inboard from the front end, a first wheel and a second wheel mounted at opposite ends of the axle on a bearing with an attachment pin securing each wheel and bearing to the axle;

a barrow having a bottom panel with a rim, a front panel, a back panel and side panels;

a bottom edge of the back panel and the side panels is attached to the rim of the bottom panel with a knuckle hinge such that the back panel is configured to pivot backward against the pair of handles and the side panels are configured to fold together over the bottom panel;

each side edge of the side panels is attached to a corresponding side edge of the front panel and the back panel with a sidewall knuckle hinge secured with a sidewall elongated hinge pin such that the front panel, the back panel and the side panels are configured to be joined together;

a bottom edge of the front panel is attached to the rim of the bottom panel with a bottom knuckle hinge secured with a bottom elongated hinge pin such that the front panel is configured for removal and for stacking on the side panels when the side panels are folded together, at least one support leg is hinged to the bottom panel, and at least one post is attached to an underside of the bottom panel, said at least one post is configured for attaching each bearing and wheel on the bottom panel with the attachment pin when the back panel is pivoted against the pair of handles, the front panel is stacked on the folded side panels and the at least one support leg is pivoted parallel to the bottom panel.

2. The collapsible wheelbarrow of claim 1 wherein each side edge of the back panel and the front panel has a flange that overlaps the side panels, each sidewall knuckle hinge including a first set of knuckles attached in a channel formed between the flange and the back panel or front panel and a second set of knuckles attached to a corresponding edge of the side panels, each of said first and second set of knuckles intermeshed and joined by the sidewall elongated hinge pin.

3. The collapsible wheelbarrow of claim 1 wherein the bottom panel is rectangular with a flat bottom.

4. The collapsible wheelbarrow of claim 3, wherein the front panel, the back panel and the side panels are flat, said front panel and said back panel are trapezoidal and the side panels are rectilinear with a longer side edge at a forward end of the barrow.

5. The collapsible wheelbarrow of claim 1 wherein a top edge of the front panel, back panel and side panels is rolled or folded over.

6. A collapsible barrow configured for attachment to a chassis with a pair of handles converging towards a front end, an axle suspended from the pair of handles inboard from the front end, a first wheel and a second wheel mounted at opposite ends of the axle on a bearing with an attachment pin securing each wheel and bearing to the axle, said barrow having a bottom panel with a rim, a front panel, a back panel and side panels, a bottom edge of the back panel and the side panels is attached to the rim of bottom panel with a knuckle hinge such that the back panel is configured to pivot backward against the pair of handles and the side panels are configured to fold together over the bottom panel, each side edge of the side panels is attached to a corresponding side edge of the front panel and the back panel with a sidewall knuckle hinge secured with a sidewall elongated hinge pin such that the front panel, the back panel, and the side panels are configured to be joined together, a bottom edge of the front panel is attached to the rim of the bottom panel with a bottom knuckle hinge secured with a bottom elongated hinge pin such that the front panel is configured for removal and for stacking on the side panels when the side panels are folded together, at least one support leg is hinged to the bottom panel, and at least one post is attached to an underside of the bottom panel, said at least one post is configured for attaching each bearing and wheel on the bottom panel with the attachment pin when the back panel is pivoted against the pair of handles, the front panel is stacked on the folded side panels and the at least one support leg is pivoted parallel to the bottom panel.

7. The collapsible barrow of claim 6 wherein the bottom panel, front panel, back panel and side panels are formed from plastic or from a composite including plastic and metal.

8. The collapsible barrow of claim 6 wherein the knuckle hinge on the back panel and the side panels is a live hinge.

9. The collapsible barrow of claim 6 wherein each side edge of the back panel and the front panel has a flange that overlaps the side panels, each sidewall knuckle hinge including a first set of knuckles attached in a channel formed between the flange and the back panel or front panel and a second set of knuckles attached to a corresponding edge of the side panels, each of said first and second set of knuckles intermeshed and joined by the sidewall elongated hinge pin.

10. The collapsible barrow of claim 6, further including a brace for the at least one support leg that unfolds and latches when the support leg is rotated vertically to the bottom panel.

* * * * *